United States Patent [19]

Broome

[11] Patent Number: 4,540,313

[45] Date of Patent: Sep. 10, 1985

[54] APPARATUS FOR THE GENERATION OF HYDROELECTRIC POWER AND METHOD OF MANUFACTURING AND INSTALLING SAME

[75] Inventor: Kenneth R. Broome, Reading, Pa.

[73] Assignee: Williams and Broome, Inc., Exton, Pa.

[21] Appl. No.: 597,465

[22] Filed: Apr. 6, 1984

[51] Int. Cl.³ .............................................. E02B 9/00
[52] U.S. Cl. ...................................... 405/78; 405/75; 290/52
[58] Field of Search .................................. 405/75–78; 290/52, 43

[56] References Cited

U.S. PATENT DOCUMENTS

| | | | |
|---|---|---|---|
| 757,909 | 4/1904 | Gilliland | 405/75 |
| 1,704,417 | 3/1929 | Zoll | 405/75 X |
| 4,311,410 | 1/1982 | Atencio | 290/52 X |
| 4,364,228 | 12/1982 | Eller | 60/398 |
| 4,476,396 | 10/1984 | Calvert | 405/78 X |

FOREIGN PATENT DOCUMENTS 123699 7/1931 Fed. Rep. of Germany ........ 405/78

Primary Examiner—Dennis L. Taylor
Attorney, Agent, or Firm—Weiser & Stapler

[57] ABSTRACT

A hydroelectric power generating plant includes separate intake and power generating barges spanning a dam, and a penstock attached to and between the barges to enable fluid communication over the dam and between the barges. In constructing the power generating plant, the barges are constructed remotely at a convenient manufacturing facility and floated to the dam site over water. At the dam site the barges are positioned so as to span the dam, making use of a lock system associated with the dam, and moored in position. The barges may be floated adjacent to opposite side of the dam, or grounded, making use of discrete moorings associated with the dam site and/or the dam itself.

38 Claims, 6 Drawing Figures

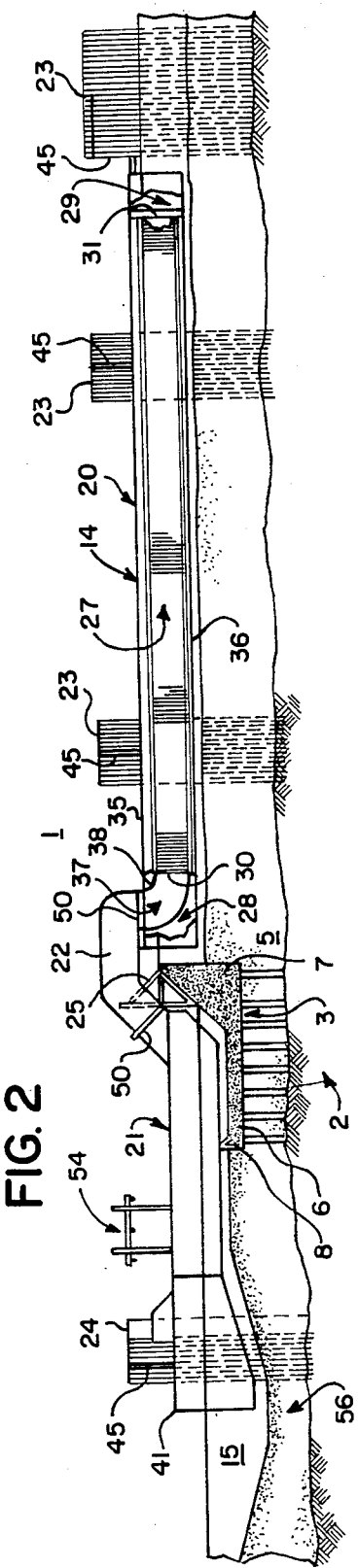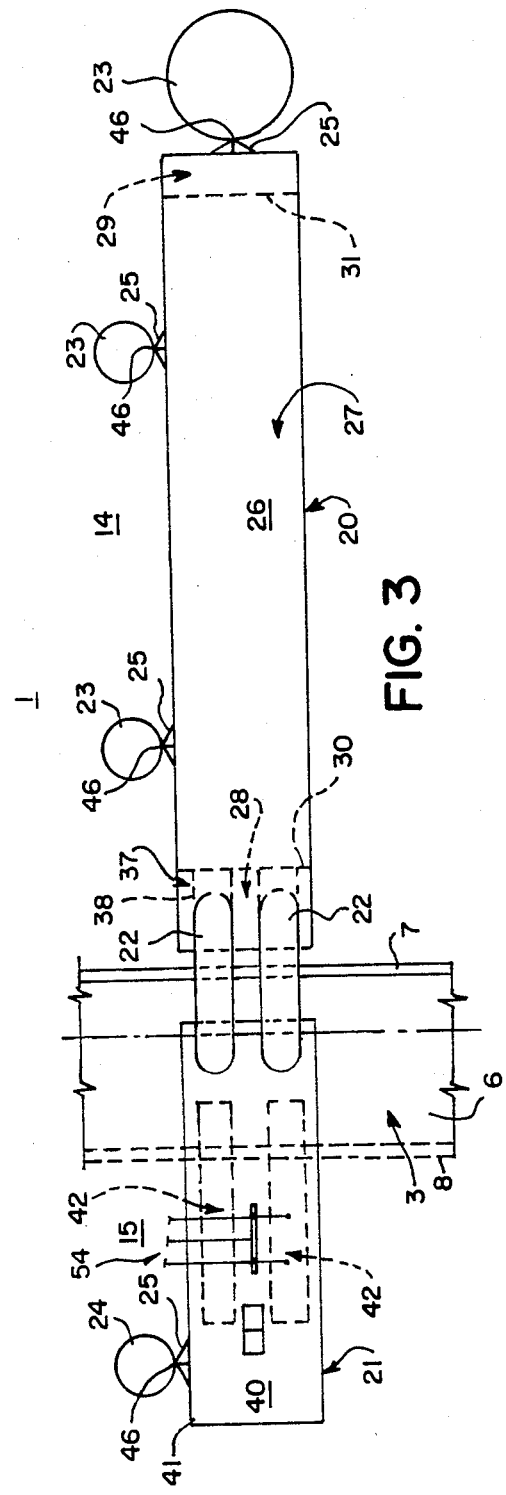

APPARATUS FOR THE GENERATION OF HYDROELECTRIC POWER AND METHOD OF MANUFACTURING AND INSTALLING SAME

BACKGROUND OF THE INVENTION

The present invention relates generally to hydroelectric power generation, and in particular, to a hydroelectric power generating plant which affords improved versatility and applicability in use and construction.

Ideally, a hydroelectric power generating plant is designed in conjunction with an associated dam so that provision is made for penetration of the dam by the penstocks required to conduct water to the turbines, and so that construction of the plant may take place simultaneously with construction of the dam. However, under certain circumstances, the simultaneous design and construction of a dam and power generating plant is not possible. For example, as a result of recent increases in the demand for power, it has become desirable to retrofit many existing dams and spillways, originally constructed primarily for purposes of flood control, water supply, navigation, and recreation to now provide a means for generating electric power. Alternatively, many sites which are capable of being dammed to develop a head which is sufficient to generate electric power are incapable of such use because the cost of constructing the dam and associated power plant by conventional means would not be justified by the expected quantities of power which the resulting station could produce.

Turning first to the retrofitting of a dam, the primary difficulty to be addressed is the manner in which the dam or spillway then in place is to be modified to permit the passage of water through the dam and to the turbines in the power generating station. Traditionally, two methods have been used in this regard. First, portions of the dam have been cut away or opened to develop a desired flow path. Second, penstocks or open channels have been created around the abutments adjacent to the existing dam or spillway. In a few instances, siphon penstocks have been used between fixed intake structures and power generating stations attached to the dam in the conventional manner. In any event, such constructions have generally been avoided due to a variety of practical considerations.

For example, it will be understood that the technique of retrofitting water passages either through or around existing dams gives rise to the potential for certain dangers to person and property which must be heavily weighed when considering the benefits to be potentially derived. Structural modification of the dam or spillway, or excavation of the dam's abutments, requires that painstaking care be taken to avoid the possibility of damaging the installation or creating leakage paths that might result in progressive failure of the dam. Moreover, irrespective of the technique used, it then becomes necessary to temporarily divert or exclude water in the vicinity of those portions of the installation being modified since it is not possible to undertake such modifications in the presence of water. Such exclusion is traditionally accomplished by means of a series of cofferdams surrounding the vicinity of the installation under modification to provide a temporary damming structure capable of holding back the water in that area.

Also to be considered is that modification of an existing installation, irrespective of the method used, as well as the construction of temporary cofferdamming to enable such modifications to be made, is an exceedingly costly operation which can often preclude the economic feasibility of a given project, particularly a project which is only expected to be marginally productive.

Construction costs are also of primary importance in connection with the development of new dam sites at locations which are capable of producing hydroelectric power, but only in marginally acceptable quantities. This would particularly apply to smaller streams, or streams exhibiting relatively poor flow gradient characteristics, in turn decreasing the head which is potentially available for power production and accordingly limiting the amount of power which such a site is capable of producing. Often, it is not feasible to develop an available site only because the quantities of power which can be expected to be derived from the installation do not justify the anticipated costs of design, construction and maintenance.

Another difficulty which has been encountered in connection with new dam constructions, either marginally productive or otherwise, is that desired construction and operational parameters must be balanced against certain environmental considerations necessary in protecting the ecological system then in effect at the site under construction. For example, numerous regulations have been imposed to assure that diverted water flows do not unacceptably compromise the ecology of the dam site, or adversely affect wildlife (aquatic and otherwise) inhabiting the dam site. One such regulation involves the preservation of "in-stream" flow conditions, requiring that water being diverted through the power station at or below the dam actually be selectively released over the dam in specified proportions in the event that a river's original flow characteristics cannot be at least marginally maintained. Such requirements have generally been found to be inconsistent with the requirements of constructing hydroelectric power stations, which are inherently disruptive of in-stream flow in their most economically feasible form. This is because the major components of a hydroelectric power generating station are most conveniently installed at a river bank location on either side of the dam in order to provide convenient and economical access for construction personnel, and to facilitate installation of the relatively heavy equipment which will ultimately comprise the power plant. Such placement necessitates a significant diversion of the river's flow to reach the power generating plant when in operation, leading to a disruption of "in-stream" flow characteristics at the installation site.

A final consideration which cuts across all of the foregoing considerations is one of cost. Several difficulties in achieving cost-effectiveness have already been discussed in relation to the several construction methods described above. Other cost considerations also present themselves, not the least of which is that irrespective of the construction involved, significant portions, if not all of the construction must take place at the dam site. This may present difficulties in that the work site is remote and not readily accessable to construction personnel, or for the delivery of materials to the work site. Also to be considered are problems in servicing the installation after it has been constructed. Obviously, a site which is inconveniently accessed during construction will be inconveniently accessed during subsequent servicing procedures, particularly major overhauls.

Most of these limitations in hydroelectric power plant construction have long been recognized, but have largely been ignored since the number of economically feasible construction sites available were considered sufficient to satisfy then existing power demand. However, it has recently come to pass that this is not the case, and that additional sites must now be developed to satisfy future demand projections without making use of non-renewable sources of energy. This is particularly so in view of the Federal Power Act, which mandates that the Federal Energy Regulatory Commission encourage maximum use of renewable resources such as hydroelectric power in the best interest of the public. Accordingly, a need has recently arisen to develop new devices for producing hydroelectric power at sites which have previously not been economic to develop and which rise to the mandates of present regulations and demand.

One such attempt which is noteworthy in this regard is a "Modular Hydro-Dam" which was developed for the Department of Energy under Cooperative Agreement No. DE-FC07-80ID12205 in July, 1981. The concept involved a modular construction which essentially incorporates all of the features of a dam and a hydroelectric power plant in a single unit capable of being transported over water to the site under construction and then grounded in place upon a suitable foundation formed at the site. This afforded significant versatility in that the only major modifications needed at the installation site related to construction of a foundation, all other major aspects of construction occurring at a shipyard or other appropriate construction site which was more conducive to prefabricated construction techniques at reduced costs. While providing an interesting approach to the problem, such a concept was not generally applicable to the retrofitting of dams and spillways which were already in place, and accordingly was not deemed capable of providing a universal solution to the problems discussed above.

It therefore remained desirable to develop a hydroelectric power plant construction which is adaptable to each of the several different kinds of installation discussed above, and which is capable of meeting present design requirements and environmental regulations.

SUMMARY OF THE INVENTION

It is therefore a primary object of the present invention to provide a hydroelectric power generating plant of improved construction.

It is also an object of the present invention to provide a hydroelectric power generating plant which is adaptable to varied construction site requirements including those involving existing dams and spillways, as well as for new installations.

It is also an object of the present invention to provide a hydroelectric power generating plant which is adaptable to such installations, and which is capable of meeting various environmental requirements relating to the installation site.

It is also an object of the present invention to provide a hydroelectric power generating plant which is capable of providing the foregoing improvements, yet which is sufficiently cost effective to justify the undertaking.

It is also an object of the present invention to provide a hydroelectric power generating plant which is relatively inexpensive and simple in construction, and which is thereafter conveniently serviced.

It is also an object of the present invention to provide a hydroelectric power generating plant which is capable of maintaining acceptable in-stream flow characteristics of the river within which the plant is being constructed.

These and other objects are achieved in accordance with the present invention by providing a hydroelectric power generating plant which comprises a plurality of discrete components capable of remote prefabrication, and subsequent local assembly at the dam site in convenient fashion. To this end, three basic components are provided. A first barge is provided which contains all of the equipment necessary to generate hydroelectric power from a received water flow and head. A second barge is provided which includes an intake system capable of drawing water to develop the necessary flow and head. Both barges are adapted for prefabricated construction at a remote manufacturing facility, and for subsequent transport to the dam site by water. After transport to the dam site, the barges are respectively positioned so as to be above and below the dam, the barge which contains the hydroelectric power generating equipment being located downstream of the dam and the barge which contains the intake equipment being located upstream of the dam. Lastly, a siphoning penstock is attached to and between the barges, extending over the dam to develop fluid communication between the respective barges.

In retrofitting an existing dam or constructing a new dam in accordance with the present invention, preparing the work site to receive the power generating plant involves only the construction of suitable caissons or dolphins which are capable of appropriately mooring the barges in their desired position, appropriate preparation of the river bed downstream of the dam to receive the barge which contains the hydroelectric power generating equipment and to accommodate the discharge of water from the power generating barge, and to provide facilities for connecting the power from the generators to the transmission system.

It will be understood that certain movement may be encountered in connection with such barge equipment, particularly changes in river depth, or turbulence encountered as a result of storms, floods and the like. To accommodate such movement, the barges are preferably secured in position by means of brackets connecting the barges to fixed moorings in a manner which enables vertical movement of the barges without undue lateral shifting. Additionally, the siphoning penstock is provided with universal joints capable of accommodating respective movement between the barges without damaging the siphoning penstock as a result of encountered angular displacements.

For further detail regarding a preferred embodiment installation produced in accordance with the present invention, reference is made to the following detailed description, taken in conjunction with the following illustrations.

BRIEF DESCRIPTION OF THE DRAWINGS

FIG. 2 is a partially sectioned, side elevational view of the hydroelectric power generating plant illustrated in FIG. 1.

FIG. 3 is a plan view of the hydroelectric power generating plant illustrated in FIG. 1.

In the several views provided, like reference numerals denote similar structure.

DETAILED DESCRIPTION OF THE PREFERRED EMBODIMENT

Figure 1:
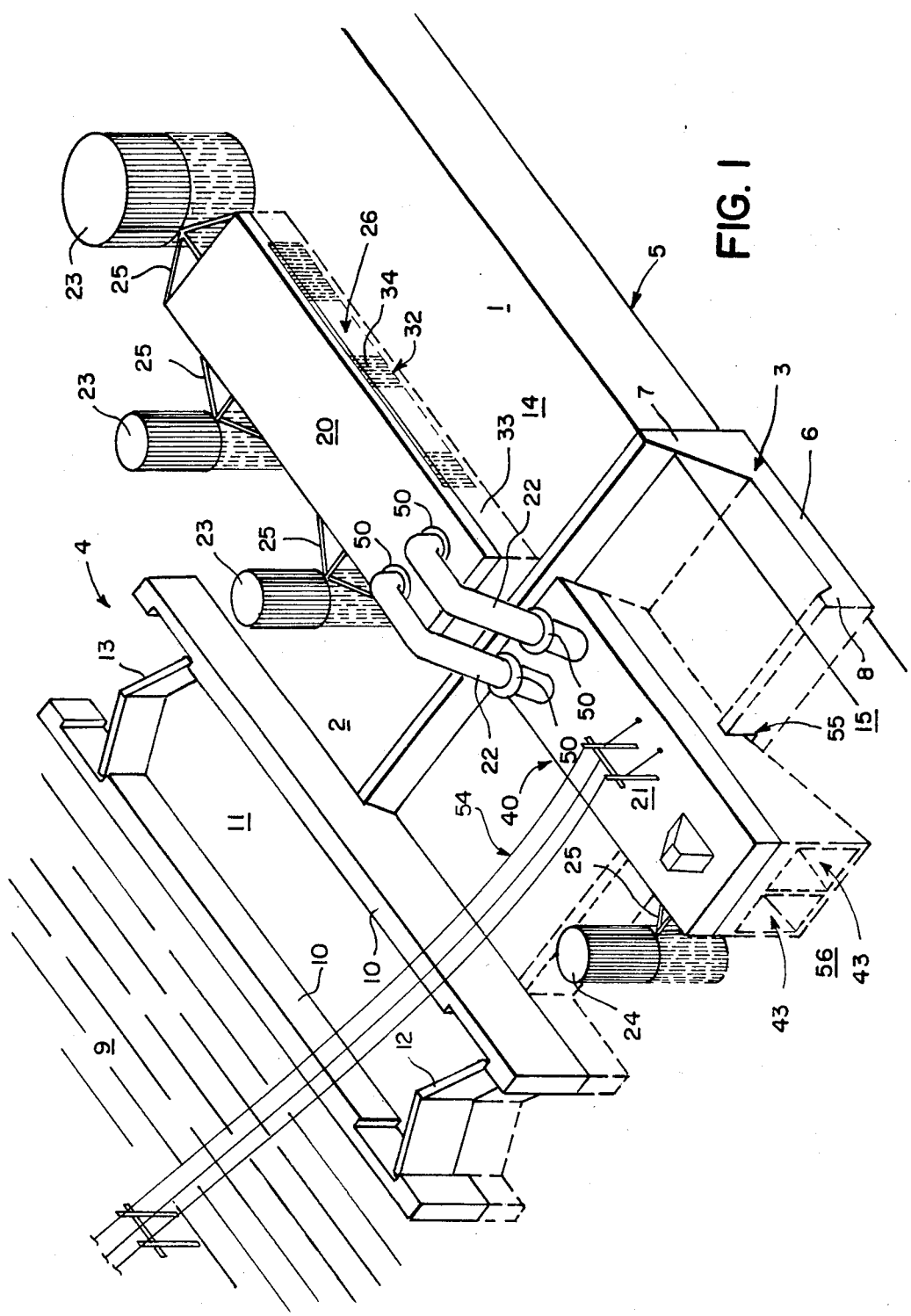
FIG. 1 is an isometric view illustrating a hydroelectric power generating plant in accordance with the present invention and its manner of assembly.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 generally illustrates an installation of a hydroelectric power plant 1 at an installation site 2 incorporating a dam 3 in combination with a lock system 4. It will be understood that the exemplary site 2 illustrated in the drawings may represent an existing construction which is to be retrofitted for hydroelectric power generation, or a new construction which is to incorporate a hydroelectric power generating capability. It will also be understood that the exemplary installation site 2 has only been provided for the purposes of generally illustrating a power plant 1 in accordance with the present invention, and that the power plant 1 of the present invention will find general applicability to other sites incorporating different topographies and/or structural configurations.

Turning first to the composition of the dam site 2, it will be seen that the river bed 5 has been provided with a dam 3 having a foundation 6 incorporating an upwardly extending impoundment wall 7 and stilling basin wall 8. The impoundment wall 7 serves as the primary member of the dam 3, retaining an existing flow of water in desired fashion. The stilling basin wall 8 is somewhat smaller than the impoundment wall 7 and serves as the downstream enclosure of the stilling basin which prevents erosion of the river bed downstream of the dam 3. The dam 3 extends generally between the shoreline 9 and an opposing shoreline (not shown) of the river. Associated with and positioned between the shoreline 9 and the dam 3 is a lock system 4 which generally comprises a pair of spaced walls 10 forming a channel 11 capable of passing shipping and the like, and a pair of gates 12, 13 associated with ends of the channel 11 to achieve the controlled passage of such shipping between upstream portions 14 of the river and downstream portions 15 of the river, and vice versa. Of course, the above specified components are conventional, their manner of construction being well understood by a worker skilled in the art of hydroelectric power plant construction. Accordingly, such components, in and of themselves, do not form part of the present invention.

However, it shall now be assumed that the installation site 2 is to be provided with hydroelectric power and that for reasons of safety, environmental considerations, or economics, it is not desirable to modify the construction of the dam 3 in a manner which would enable conventional hydroelectric power construction techniques to be applied. To this end, and in accordance with the present invention, the following operational components are provided.

The hydroelectric power plant 1 generally comprises two barges 20, 21 locatable on opposite sides of the impounding wall 7 of the dam 3 and operatively connected with one another by means of a penstock 22. Each of the barges 20, 21 are fixed in positioned as shown by means of a plurality of mooring caissons 23, 24 which are constructed in conventional manner in the river bed 5, in operational association with a plurality of floating brackets 25 which are also essentially conventional in their basic construction. As will become apparent from the following description, the barge 20 which is positioned within the upstream portions 14 of the river acts as an intake, drawing water for delivery to the barge 21 located within the downstream portions 15 of the river by means of the penstock 22. The barge 21 serves as a means for generating hydroelectric power.

The intake barge 20 generally comprises a rectangular enclosure 26 which defines a centrally disposed, hollow cavity 27 separating cavities 28, 29 located at either end of the enclosure 26. Cavities 27 and 28 are separated by a first bulkhead 30, a second bulkhead 31 separating the cavities 27 and 29 from each other. The cavities 27, 29 are suitable in developing flotation and/or ballast which facilitates trim of the intake barge 20 upon its installation and during use, if desired.

Water is drawn into the barge 20 by means of a pair of trash racks 32 extending along opposed lateral sides 33 of the intake barge 20. Each trash rack 32 generally comprises a plurality of spaced bars 34 extending between the top 35 and bottom 36 of the barge 20, spacing between the bars 34 being such that water is freely permitted to enter the cavity 27 without drawing debris into the cavity 27, or entraining aquatic wildlife within the resulting flow. It will be noted that the trash racks 32 preferably extend fully along those portions of the sides 33 adjacent to the cavity 27 to promote uniform fluid flow of less than acceptable maximum velocity.

Water entering the cavity 27 by means of the trash racks 32 is then capable of being withdrawn from the cavity 27 by means of an intake assembly 37 in operational association with the cavity 28. The intake assembly 37 of the illustrative example provided comprises a pair of elbows 38 depending from the top 35 of the intake barge 20 and extending through the cavity 28 as shown, to withdraw water collected within the cavity 27, through appropriate apertures provided in the bulkhead 30, for subsequent delivery to a pair of penstocks 22 which respectively connect the barges 20, 21 together. Generally, the diameter of the elbows 38 will be matched to the diameter of the associated penstocks 22, and will be varied in accordance with indicated design parameters. Diameters on the order of 10 to 20 feet will ordinarily be encountered in connection with most conventional applications. It will of course be understood that any number of desired nozzles 38 may be provided as part of the intake nozzle assembly 37 in accordance with indicated design parameters and system requirements.

The power generating barge 21 generally comprises a rectangular enclosure 40, the stern 41 of which expands outwardly and downwardly as shown. The enlarged stern construction illustrated is preferred to promote correct fluid discharge from the barge 21 and into the downstream portions 15 of the river, to enhance operation of the power generating equipment utilized and to minimize undesirable environmental impact. Positioned within the enclosure 40 is appropriate power generating equipment, as is generally illustrated in phantom at 42. It will be understood that any of a variety of conventionally available components (e.g. valves, turbines, speed increasers, generators, switchgears, controls, transformers, etc.) may be used in developing the power generating equipment 42 in accordance with known techniques and desired operational parameters.

In the example selected for illustration in the drawings, two discrete power generating plants have been provided in parallel, each of which is separately connected between respective penstocks 22 and draft tube exits 43 associated with the stern 41 as shown. Again, it will be understood that the number of power generating plants provided, as well as their individual structural makeup, may be varied in accordance with the design parameters which are anticipated in connected with the system under construction. It will further be noted that in the illustrative example, a corresponding number (two each) of elbows 38, penstocks 22, power generating plants and draft tube exits 43 have been utilized. However, it will be understood that other systems may be developed which make use of different combinations. For example, a single elbow 38 feeding a single penstock 22 may be subdivided at the barge 21 to operate a pair of power generating plants in connection with either a single draft tube exit 43, or a plurality of draft tube exits 43. It will be understood that such versatility in design will enable certain standardization in design, if desired, in that a plurality of essentially similar components may be ganged as needed to achieve a given result, as opposed to necessitating the use of a single, custom designed unit to do so. Other variations will also become apparent to those skilled in the art.

It will be noted that the barges 20, 21 are located on opposite sides of the dam 3, communicating with one another by means of the penstocks 22, giving rise to certain special design considerations.

For example, since it is required that the penstocks 22 convey water drawn from the intake barge 20 over the dam 3 for delivery to the power generating barge 21, the construction of the penstocks 22 must be of sufficient integrity to support not only the weight of the penstocks 22, but the weight of the water carried as well. Moreover, since a siphoning penstock 22 must be provided to draw water over the dam 3, the construction of the penstock 22 must be able to withstand the vacuum or negative pressurized water which is used to start the siphoning action when operation of the power plant 1 is to be initiated. Of course, once the siphoning has been started, this latter consideration dissipates since the siphoning process continues without the further application of such stimulus to the system. In any event, the siphoning penstocks 22 may be constructed of any material which is suitable to such design constraints.

As a further consideration, it will be understood that various dynamic conditions will develop differences in respective water levels exhibited in the upstream and downstream portions of the river which are normally in a particular relative position, but which at other times may approach the same elevation. It will also be understood that certain extreme weather conditions may give rise to wave action and turbulence in the vicinity of the barges 20, 21. Such conditions may manifest themselves in vertical movement of the barges 20, 21 and/or a tendency towards lateral shifting of the barges 20, 21, either in the river bed 5 or with respect to one another.

To accommodate such occurences, the following structural improvements are provided.

As previously indicated, each of the barges 20, 21 are appropriately moored on opposite sides of the dam 3 by means of brackets 25 attached to the barges and in operational association with either the dam 3 or with the caissons 23, 24. To this end, either the dam 3 or the caissons 23, 24 are provided with vertically extending tracks 45 which are capable of receiving ends 46 of the brackets 25 in a manner which permits free vertical movement of the brackets 25 while limiting rotation about their ends 46. In this manner, necessary vertical movement of the barges 20, 21 is accommodated without developing unacceptable lateral shifting of the barges 20, 21 with respect to their moorings. Such floating brackets 25 are known in the art and therefore need not be described in further detail.

Figure 6:
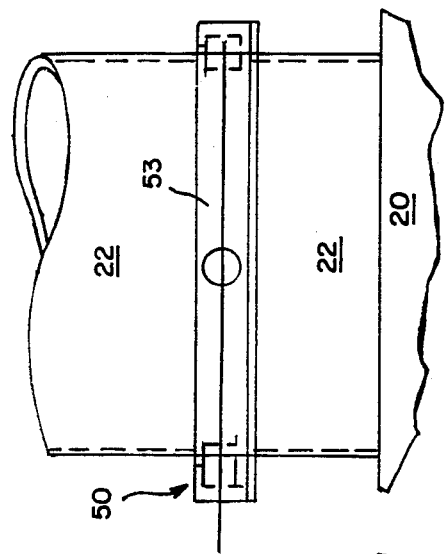
FIG. 6 is a partial, elevational view of a penstock incorporating a third alternative embodiment universal joint.
Figure 5:
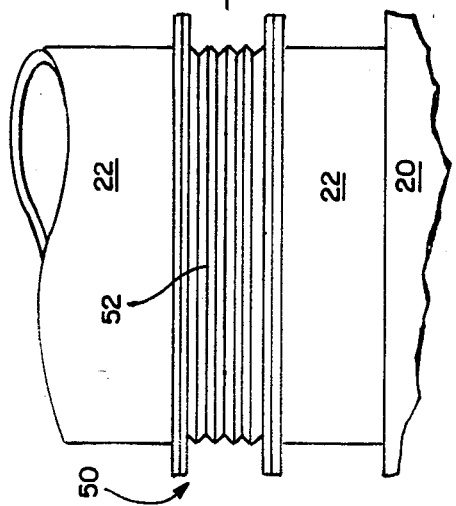
FIG. 5 is a partial, elevational view of a penstock incorporating a second alternative embodiment universal joint.
Figure 4:
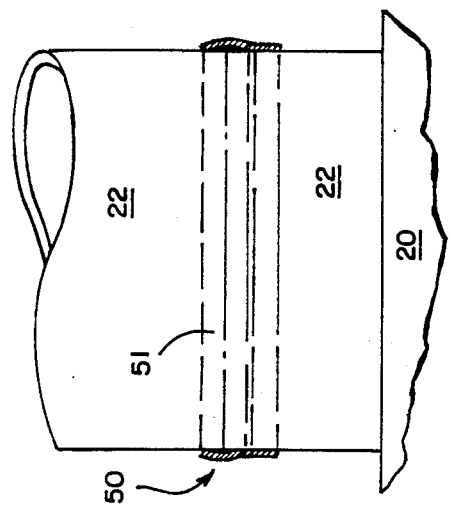
FIG. 4 is a partial, elevational view of a penstock incorporating a first alternative embodiment universal joint.

To accommodate relative movement developed between the barges 20, 21, universal joints 50 are operatively associated with each of the penstocks 22. Preferably, a pair of universal joints 50 are associated with each penstock 22 at or near the ends of the penstock 22 which communicate with the barges 20, 21. Each of the universal joints 50 should preferably be capable of developing three degrees of freedom for the limited range of angular penstock movement anticipated. Universal joints 50 of either the "ball and socket" type 51 (FIG. 4), the "bellows" type 52 (FIG. 5), or the "trunnion" type 53 (FIG. 6), may be used to provide this function, provided the construction selected is capable of being sealed against vacuums, is structurally able to transmit applied loads, is sealed against the ingress of air, and is suitable for the purpose of retaining water within the penstock 22, in the vicinity of the associated universal joint. In this manner, relative motion between the barges 20, 21 resulting from turbulence or disproportional changes in upstream and downstream water levels are accommodated to avoid damage to the penstocks 22 while maintaining the passage of water at less than atmospheric pressure.

Having described the various components which comprise the power plant 1, an exemplary installation of the power plant 1 will now be described. Although it will be understood that the power plant 1 of the present invention will operate in connection with any of a variety of different installations, it shall be assumed for the purposes of discussion that an existing dam 3 is to be retrofitted with hydroelectric power, and that the dam 3 incorporates a lock system 4.

To take advantage of their modular construction, the barges 20, 21 and the penstocks 22 would preferably be manufactured at some remote location which is deemed convenient, such as a boatyard or other existing manufacturing facility where labor and materials are readily available and accessible. Thus, the use of conventional manufacturing techniques may be applied to what had previously required tailored, on-site construction techniques, enabling the use of standardized designs for many different applications. The barges 20, 21 are preferably constructed of steel or concrete, and are capable of being freely dimensioned so long as the resulting construction is capable of being transported into location as will be described more fully below.

In constructing the power generating barge 21, special attention must be paid to framing of the barge, which must be able to support the weight of the power generating equipment used, and to those stern portions of the barge which define the draft tube exits 43, which are preferably formed so as to be separated from the barge 21 to improve its navigability during transport.

On-site preparation for the installation essentially merely involves appropriate construction of the caissons 23, 24 at locations adjacent to the anticipated mooring points for the barges 20, 21, unless the existing structure of the dam 3 calls for special on-site modifications to correctly receive the power plant 1. For example, it may be necessary to cut a slot 55 in the stilling basin wall 8 of the dam 3 to enable passage of the bottom of the barge 21 beyond the wall 8 and into position adjacent to the impoundment wall 7 of the dam 3. This is preferred so as to enable the bow of the barge 21 to approach the dam 3 as closely as is possible to reduce the length of the communicating penstocks 22. Alternatively, it may be necessary to prepare the river bed 5, at 56, to accommodate the increased depth and to withstand the increased water flow which can be expected as a result of discharge from the draft tube exits 43. This latter preparation generally involves suitable excavation of the river bed at 56, and placement of stones or other durable materials along the excavation 56 to accommodate the anticipated increase in water flow.

Once the site 2 has been prepared and the various components comprising the power plant 1 have been constructed, the barges 21, 22 are conveniently transported by water to the site 2. Upon reaching the site 2, depending upon the direction from which the components approach the dam 3, one of the barges is then transported through the lock system 4 so that the barges 20, 21 are positionable on opposite sides of the dam 3. Of course, this will require that at least the barge being passed through the lock system 4 be dimensioned in both width and draft so as to enable such passage. The floating barges 20, 21 are then located adjacent to the abutment 7 of the dam 3 and alongside any prepared caissons 23, 24 to be used, and moored to such structures, as appropriate, by means of the barge mounting brackets 25. If, as previously mentioned, the draft tube exits 43 are fabricated separately from the barge 21, such structure would at this point be fitted to the barge 21 by appropriate welding or bolting in place. Lastly, the penstocks 22 are fitted between the barges 20, 21 to complete the assembly. Of course, appropriate power lines 54 would be connected to the barge 21 to receive the power generated. Ordinarily, this will complete the assembly and the barges 20, 21 will be allowed to float in secured position as shown by means of the barge mounting brackets 25, accommodating both changes in water level and encountered turbulence. Alternatively, the barges 20, 21 may be grounded to develop a more permanent form of installation. In such case, use of some or all of the moorings previously discussed may be omitted, if appropriate.

In either event, subsequent servicing of the barges 20, 21 may be accomplished either at the site 2, or if major servicing is indicated, by detaching and again transporting the barge requiring service to a remote facility which is more conveniently capable of such servicing. In connection with floating barges, this is simply accomplished by reversing the foregoing steps. In connection with barges which have been grounded, it would of course first be required to float the barge requiring service by introducing compressed air into appropriate ballast tanks associated with the barge, and to then proceed as previously described.

It will therefore be seen that the foregoing apparatus and method of assembly serve well to satisfy each of the objectives previously set forth. It will also be understood that the foregoing apparatus and method of assembly are capable of variation without departing from the spirit and scope of the present invention. Many such variations have been referred to previously. Also to be considered is that the moorings used to secure the barges 20, 21 in position may be freely varied in both type and positioning. Alternatively, all or portions of the barges 20, 21 may be moored directly to the dm 3 and/or the walls 10 of the lock system 4, eliminating the need for some or even all of the caissons 23, 24 if desired.

An important alternative construction which may be developed in accordance with the present invention involves the use of multiple, discrete power plants 1 positioned at spaced intervals along the dam 3. In addition to provide a means for producing additional power, this capability has the advantage of enabling a hydroelectric power generating facility to be matched to the flow distribution characteristics across the width of the river with which it is associated. Spacing discrete power plants 1 at desired regular or irregular intervals in accordance with river flow characteristics enables the maintenance of "in-stream" flow conditions in accordance with pertinent environmental regulations without requiring the wasteful spill which is generally required to satisfy such regulations in conjunction with existing, fixed installations. Other variations in deployment of the various components comprising the power plant 1 will also be apparent.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for generating hydroelectric power in association with damming means spanning at least portions of a fluid flow, said apparatus comprising:
   a first barge adapted for floating and located adjacent to and upstream of said damming means, said first barge incorporating means for withdrawing fluid from said fluid flow;
   a second barge adapted for floating and located adjacent to and downstream of said damming means, said second barge incorporating means for generating said power in response to a received water flow and head; and
   penstock means having respective ends attached to and extending between portions of the first barge and portions of the second barge so that said first barge is placed in fluid communication with said second barge, and so that fluid withdrawn from said first barge is capable of being delivered over the damming means to the second barge to develop said water flow and head.

2. The apparatus of claim 1 wherein said damming means is a dam impounding a water flow.

3. The apparatus of claim 1 wherein said damming means is a spillway spanning a water flow.

4. The apparatus of claim 1 wherein said damming means incorporates lock means for passing navigable vessels, and wherein said lock means is capable of passing at least one of said first and second barges therethrough.

5. The apparatus of claim 1 which further comprises fixed means for mooring said first and second barges adjacent to said damming means.

6. The apparatus of claim 5 wherein said mooring means is a caisson formed in the fluid flow.

7. The apparatus of claim 5 wherein said mooring means forms part of said damming means.

8. The apparatus of claim 5 which further comprises bracket means for securing said first and second barges to said mooring means.

9. The apparatus of claim 8 wherein said bracket means are capable of slidingly engaging said mooring means so that vertical motion of said bracket means is enabled and lateral motion of said bracket means is inhibited.

10. The apparatus of claim 1 wherein said first barge includes a hollow cavity for receiving fluid from said fluid flow, and elbow means in association with said hollow cavity and positioned to withdraw fluid from said fluid flow for delivery to said penstock means.

11. The apparatus of claim 10 wherein screening means separate the cavity of said first barge from said fluid flow.

12. The apparatus of claim 10 wherein said first barge further comprises flotation/ballast means in operational association therewith.

13. The apparatus of claim 1 wherein said second barge incorporates fluid inlet means and fluid outlet means, and means for generating electricity connecting and operatively associated with said fluid inlet means and said fluid outlet means.

14. The apparatus of claim 13 wherein said second barge has a plurality of discrete electricity generating means combined in a single barge.

15. The apparatus of claim 13 wherein said fluid outlet means is a draft tube diverging generally downwardly and rearwardly from said second barge.

16. The apparatus of claim 1 wherein said penstock means incorporates universal joint means for accommodating relative movement between said first barge and said second barge.

17. The apparatus of claim 16 wherein said universal joint means is of the ball and socket type.

18. The apparatus of claim 16 wherein said universal joint means is of the bellows type.

19. The apparatus of claim 16 wherein said universal joint means is of the trunnion type.

20. The apparatus of claim 16 wherein said penstock means further comprises sealing means in operational association with said universal joint means.

21. The apparatus of claim 1 wherein said penstock means is spaced from said damming means.

22. The apparatus of claim 1 wherein said penstock means withdraws fluid for said first barge by means of suctioning.

23. A method for constructing a hydroelectric power generating means in association with a damming means spanning at least portions of a fluid flow, said method comprising the steps of:
constructing a first barge adapted for floating and incorporating means for withdrawing fluid from said fluid flow;
constructing a second barge adapted for floating and incorporating means for generating said power in response to a received head;
constructing mooring means for securing said first and second barges adjacent to said damming means;
positioning said first and second barges adjacent to and on opposite sides of said damming means, and mooring said first and second barges in position; and
attaching penstock means to and between said first and second barges, and over said damming means, said penstock means being in fluid communication with said first and second barges;
whereby fluid withdrawn from said fluid flow by means of said first barge is delivered to said second barge to develop said head.

24. The method of claim 23 wherein at least one of said barges is constructed remotely from said damming means, and wherein said method further comprises the step of transporting said remotely constructed barge from said remote location to said damming means.

25. The method of claim 24 wherein both of said barges are constructed remotely from said damming means.

26. The method of claim 24 wherein said transporting is accomplished over water.

27. The method of claim 26 wherein said damming means incorporates lock means for passing shipping between upstream and downstream portions of said fluid flow, and wherein said method further comprises the step of passing said transported barge through said lock means in conjunction with said positioning.

28. The method of claim 23 wherein at least portions of said barges are moored to caisson means positioned in said fluid flow and spaced from said damming means.

29. The method of claim 28 wherein portions of said barges are moored to portions of said damming means.

30. The method of claim 23 wherein said barges are floated adjacent to said damming means, and wherein said method further comprises the step of accommodating changes in displacement of said barges relative to changes in fluid level of said fluid flow.

31. The method of claim 30 wherein said accommodating is accomplished at the barge moorings.

32. The method of claim 30 wherein said accommodating is accomplished at said penstock means.

33. The method of claim 23 wherein fluid is withdrawn from said fluid flow by siphoning.

34. The method of claim 23 which further comprises the step of preparing said damming means for the positioning of said barges.

35. The method of claim 34 wherein said preparing includes cutting a notch in abutment portions of said damming means to receive said second barge.

36. The method of claim 34 wherein said preparing includes excavating an area adjacent to said damming means which is to receive the second barge.

37. The method of claim 36 wherein said second barge includes fluid discharge means associated therewith, and wherein said excavation receives said fluid discharge means during said positioning.

38. The method of claim 23 which further comprises the step of grounding at least one of said barges.

* * * * *